April 20, 1937. O. H. BANKER 2,077,387

CHANGE SPEED PLANETARY TRANSMISSION

Original Filed July 16, 1934    2 Sheets-Sheet 1

INVENTOR
Oscar H. Banker
BY Quarles & French
ATTORNEYS

April 20, 1937. O. H. BANKER 2,077,387
CHANGE SPEED PLANETARY TRANSMISSION
Original Filed July 16, 1934    2 Sheets-Sheet 2
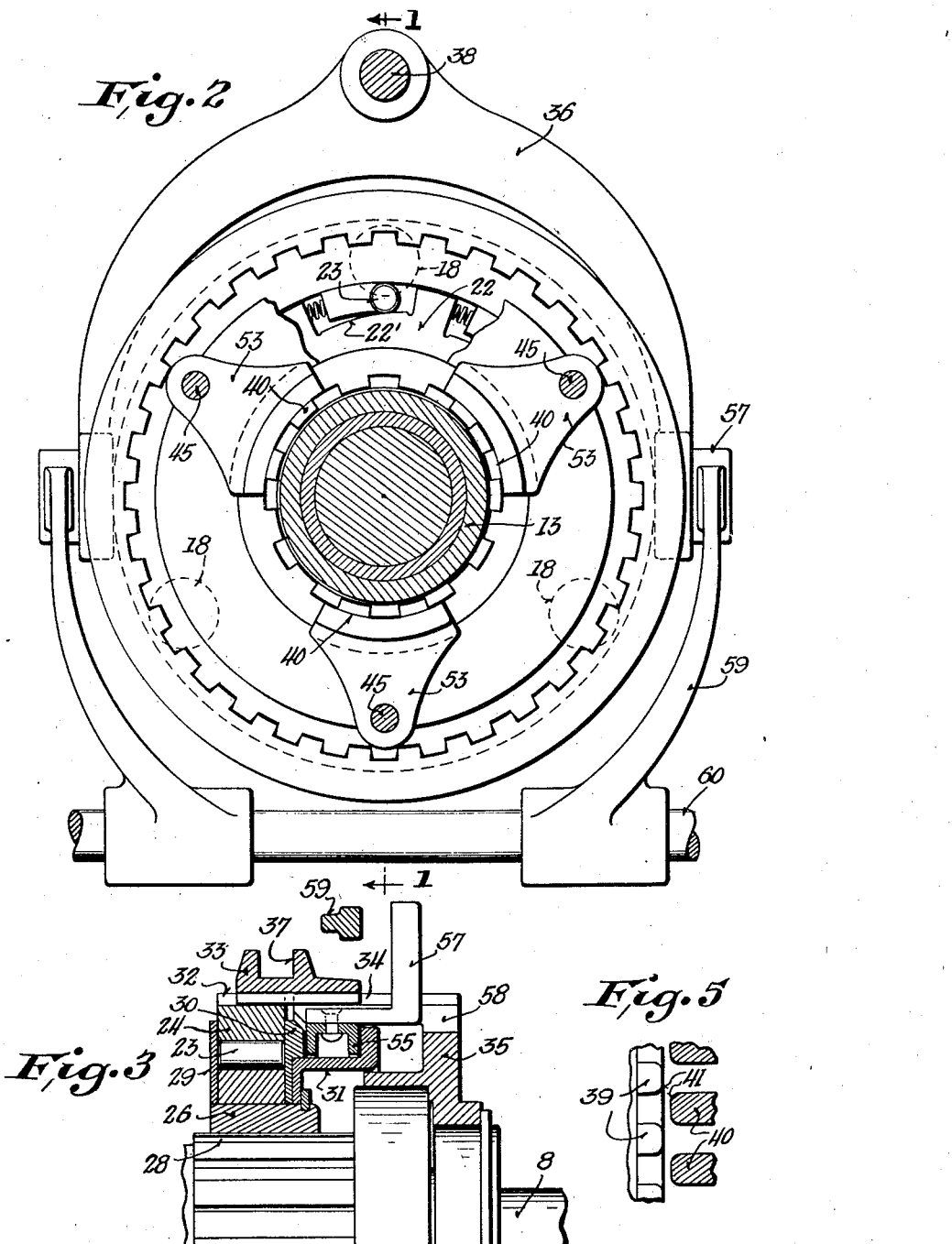
INVENTOR
Oscar H. Banker
BY Quarles & French
ATTORNEYS Patented Apr. 20, 1937

2,077,387

UNITED STATES PATENT OFFICE 2,077,387

CHANGE SPEED PLANETARY TRANSMISSION

Oscar H. Banker, Chicago, Ill., assignor to New Products Corporation, Chicago, Ill., a corporation of Illinois Application July 16, 1934, Serial No. 735,412
Renewed March 22, 1935

13 Claims. (Cl. 74—260)

The invention relates to change speed planetary transmission mechanism.

The general object of the invention is to provide an automatically variable planetary transmission unit which may be mounted behind or used in conjunction with the usual gear shift transmission of the vehicle and provide for multiple speed changes.

One of the objects of the invention is to provide a novel clutch arrangement for obtaining direct drive through the unit.

Another object of the invention is to provide a novel arrangement of mechanism for holding the planet carrier stationary for forward drive and for locking it with the drive and driven shafts to revolve as a unit therewith in reverse.

Another object of the invention is to provide a means to prevent free wheeling or to prevent the driving gear slowing down below the speed of the driven gear.

Another object of the invention is to provide a compact arrangement of change speed gears and governor mechanism for operating the main clutch.

The invention further consists in the several features hereinafter set forth and more particularly defined by claims at the conclusion hereof.

In the drawings:

Fig. 2 is a detail sectional view taken on the line 2—2 of Fig. 1;

Fig. 3 is a detail sectional view taken on the line 3—3 of Fig. 1;

Fig. 5 is a detail view, partly in section, of the main jaw clutch.

Figure 1:
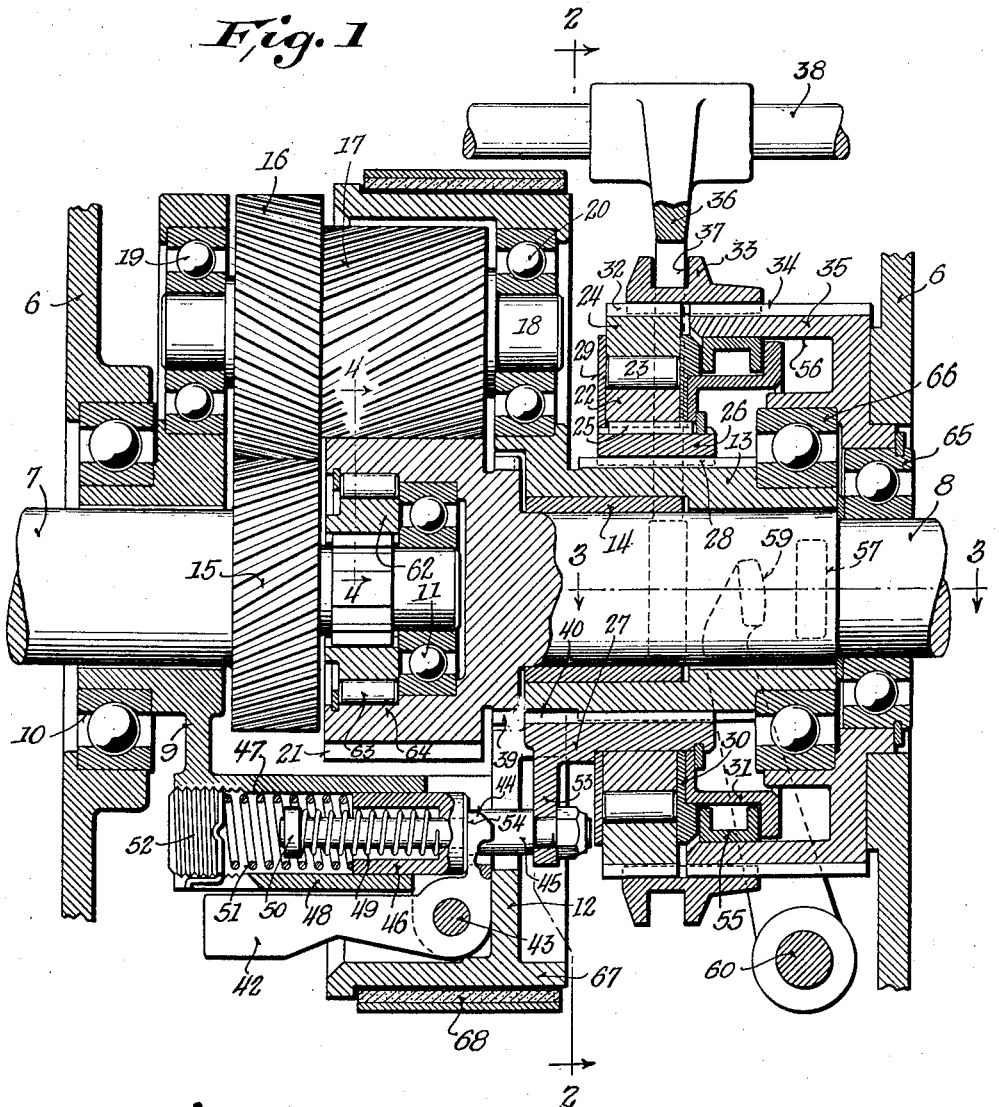
Fig. 1 is a vertical sectional view taken on the line 1—1 of Fig. 2 of mechanism embodying the invention, parts being broken away.
Figure 4:
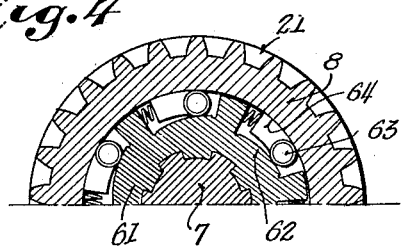
Fig. 4 is a detail sectional view taken on the line 4—4 of Fig. 1.

Referring to the drawings, the numeral 6 designates parts of the housing, 7 the drive shaft, and 8 the driven shaft of the transmission mechanism.

The drive shaft 7 extends through the hub of the spider 9 of the planetary gear carrier, and this hub is mounted in a ball bearing 10 mounted in the housing 6. The inner end of the shaft is mounted in a roller bearing 11 carried in the recessed end of the driven shaft 8.

The planetary carrier also includes a spider 12 having a hub portion 13 provided with a bushing 14 journalled on the driven shaft 8.

The drive shaft 7 has a gear 15 formed integral therewith or secured thereto meshing with the planet gears 16 which are secured with the planet gears 17 to the shafts 18 journaled in ball bearings 19 and 20 respectively in the spiders 9 and 12. The gears 17 mesh with a sun gear 21 formed integral with or secured to the driven shaft 8. The gearing connection thus provided between the shafts 7 and 8 provides for driving the shaft 8 at a different speed from that of shaft 7, and in the present instance this gearing is a reduction gearing and functions when the planetary gear carrier is held stationary.

For holding the planetary gear carrier stationary or against backward movement, I have provided a one way automatic brake including the actuator 22 provided with the inclined roller receiving grooves 22', brake rollers 23 and brake drum 24.

The actuator 22 is keyed at 25 to the hub 26 of a clutch element 27, slidably splined at 28 on the hub portion 13 of the planetary carrier.

The brake drum 24 is held in alinement with the actuator and the rollers retained in position by means of the retainer plates 29 and 30, the plate 30 having the flanged ring 31 secured thereto and rotatable with the actuator. The drum 24 is secured against rotation by a splined connection at 32 with a locking ring 33 which also has a similar splined connection at 34 with a stationary member 35, said ring 33 being shiftable relative to parts to which it is keyed through the action of a shifter fork 36 engageable in the groove 37 of said ring and moved by a manually shiftable rod 38.

With the above described construction when the drum 24 is held against rotation as shown in Fig. 1 and the drive shaft 7 revolves clockwise, the driven shaft 8 will be driven through the gearing and the tendency of the planetary carrier to rotate anticlockwise acts through the actuator 22 to apply the rollers 23 to the drum 24 and hold the planetary carrier stationary.

For direct drive of the shaft 8 speed responsive operated clutch mechanism is provided for locking the carrier to the driven shaft and including a jaw clutch member 39 formed integral with or secured to the driven shaft, and shiftable jaw clutch members 40 forming parts of the clutch element 27. The faces 41 of these jaw clutch members are pointed as shown in Fig. 5 so that these parts may engage easily when synchronized.

The speed responsive means for actuating the clutch member 27 includes a plurality of weighted levers 42 mounted on the planetary carrier and operatively connected to said clutch member. In each instance the lever 42 is pivotally mounted intermediate its ends on a pin 43 and has a forked arm 44 straddling the rod 45 and engageable with a thimble 46 slidably mounted on said rod and also slidably mounted in the bore 47 of a tubular projection 48 formed as a part of the spider. Pressure from the lever 42 is transmitted through the thimble 46 to a spring 49 and thence to the rod 45, said spring being interposed between said thimble and a stop collar 50 on said rod. Movement of the thimble by the lever 42 is resisted until a predetermined speed is reached by a spring 51 interposed between said thimble and a stop screw 52 in threaded engagement with the bore 47. Each rod 45 is anchored to a lug 53 forming part of a jaw clutch member 40, and it will be noted from Fig. 2 that there are three of these equally spaced apart. Thus the governor units for operating these rods are similarly spaced apart, and they are mounted in the planetary carrier in the spaces between the sets of planet gears whose shafts 18 are shown in dotted lines in Fig. 2.

With the above construction after a predetermined speed of the driven shaft 8 is reached, while travelling in gear, if the operator wishes to go into direct drive, he temporarily decelerates the speed of drive shaft 7 to bring about a synchronization in speed between said shaft and the driven shaft, and this then causes the driven shaft to drive the planetary carrier through the gear 21 and in a direction to release the brake rollers 23 from the drum 24. As the carrier rotates with the gear 21 the weighted levers 42 overcome the resistance of the springs 51 and act through the thimbles 46, springs 49 and rods 45 to move the clutch element 27 with its clutch members 40 into position for engagement with the mating clutch member 39 and when these members are synchronized, they will engage and then the planetary gear carrier will be locked to the driven shaft and the planet gear 16 will then lock the carrier to the gear 15 of the drive shaft so that the shafts and gearing will revolve as a unit. Before the clutch members mesh the members 40 may overrun the member 39 through the yielding connections between the member 40 and the weights 42 afforded by the springs 49.

If under conditions of direct drive the speed of the vehicle drops below a certain value, the springs 51 will act on the thimbles 46 and rods 45 to shift the clutch element 27 to a release position and bring the weights 42 to their contracted position. In this connection it is to be noted that the rods 45 have shoulders 54 against which the thimbles 46 abut for the return of said rods and their associated parts.

A shiftable ring 55 is slidably mounted in the cylinder 56 formed by the member 35 and is disposed to work between the retainer ring 30 and the flanged ring 31 so that it moves therewith and is provided with oppositely disposed stop flanges 57 working through slots 58 in the member 35. Thus the ring 55 moves as a unit with the parts 30, 31, 22, 23, 24 and the clutch element 27 to which the plates 30 and 31 and the actuator 22 are secured. The mounting of the one way brake mechanism on the element 27 so as to move therewith produces a compact construction and reduces the overall length of the device.

When under conditions of direct drive of the unit the operator desires to proceed immediately in gear, the jaw clutch may be disengaged by shifting the member 27 out of engagement with the member 39 by the engagement of the shifter fork 59 with the flanges 57 and the turning of the shaft 60 in a direction to shift said ring 55 and the parts connected thereto including the member 27 toward the right. The flanges 57 are shown in dotted lines in Fig. 1 in the release position of the clutch member 27 and the shifter fork 59 is shown in its normal inoperative position to permit the automatic engagement of the jaw clutch mechanism as previously described.

To assist in the engagement of the main or jaw clutch and also to permit the driven shaft 8 to act as driver under certain conditions and also prevent free wheeling through the gearing, I have provided an overrunning or one way clutch including an actuator 61 keyed to the drive shaft 7 and provided with clutch roller receiving recesses 62 in which the clutch rollers 63 are mounted and adapted when the shaft 7 revolves counterclockwise to be moved in driving engagement with a drum 64 formed as a part of the driven shaft 8.

The member 35 is secured to the casing 6 and has the outer race rings of the journal bearings 65 and 66 mounted therein; the inner race ring of the bearing 65 receiving the shaft 8 while the inner race ring of the bearing 66 receives the hub 13 of the planetary carrier.

For reverse the member 33 is moved toward the right to release it from locking engagement with the brake drum 24 so that the planetary carrier may rotate freely in a counterclockwise direction and then the shaft 7 in rotating counterclockwise will drive the shaft 8 through the overrunning clutch 62, 63, and 64 and the planet carrier and its gears will then revolve with these shafts in the reverse direction. Thus the mechanism revolves as a unit in a one to one ratio in reverse and the reverse of the shaft 7 is brought about by the reverse gearing of the transmission with which the present unit is used.

For holding the mechanism in gear as long as desired the spider 12 has a brake drum portion 67 adapted to be engaged by a manually applied brake band 68. The mechanism for controlling the band 68 and preferably in conjunction with the shaft 60 may be of any suitable construction and may be similar to that shown in my prior U. S. Patent No. 1,943,293, dated January 16, 1934, for similar parts.

The above described construction provides an under drive unit for use in conjunction with a standard transmission wherein the driven shaft rotates at a one to one ratio with the drive shaft in forward or reverse and may also under automatic and manual control be driven at a reduced gear ratio from said drive shaft.

I desire it to be understood that this invention is not to be limited to any particular form or arrangement of parts except in so far as such limitations are included in the claims.

What I claim as my invention is:

1. In a change speed transmission, the combination of a drive shaft, a driven shaft, change speed planetary gearing between said shafts for driving said driven shaft at a different gear ratio from that of said drive shaft, jaw clutch mechanism of the overrunning type for connecting said gearing to revolve as a unit with said shafts for direct drive, speed responsive means controlling said clutch mechanism, and an overrunning clutch forming a drive connection between said shafts for reverse drive.

2. In a change speed transmission, the combination of a drive shaft, a driven shaft, change speed planetary gearing between said shafts including a planetary gear carrier and spaced sets of planet gears mounted on said carrier, jaw clutch mechanism for connecting said gearing to revolve as a unit with said shafts for direct drive, and speed responsive mechanism mounted on said carrier in the spaces between said planet gears and operatively connected to said clutch mechanism.

3. In a change speed transmission, the combination of a drive shaft, a driven shaft, change speed planetary gearing between said shafts including a planetary gear carrier, an automatic one way brake mechanism for holding said carrier against backward movement, a jaw clutch mechanism including a shiftable clutch element for connecting said gearing to revolve as a unit with said shafts for direct drive, speed responsive means controlling said shiftable clutch element, said shiftable clutch element having said one way brake mechanism mounted thereon.

4. In a change speed transmission, the combination of a drive shaft, a driven shaft, change speed planetary gearing between said shafts for driving said driven shaft at a different gear ratio from that of said drive shaft, jaw clutch mechanism of the overrunning type for connecting said gearing to revolve as a unit with said shafts for direct drive including a shiftable clutch element, speed responsive means controlling said shiftable clutch element, and manually operable means for releasing said clutch element for immediately establishing the drive through said gearing.

5. In a change speed transmission, the combination of a drive shaft, a driven shaft, change speed gearing between said shafts, jaw clutch mechanism of the overrunning type for connecting said gearing to revolve as a unit with said shafts including a shiftable clutch element, speed responsive means for actuating said element including a weighted lever, a rod, a member slidably mounted on said rod, a spring connection between said rod and member, and spring means acting on said member and normally resisting the movement of said weighted lever.

6. In a change speed transmission, the combination of a drive shaft, a driven shaft, change speed planetary gearing between said shafts including a planetary gear carrier and spaced sets of planet gears mounted on said carrier, jaw clutch mechanism connecting said gearing to revolve as a unit with said shafts for direct drive including a shiftable clutch element, an automatic one way brake mechanism for holding said carrier against backward movement and mounted on said shiftable element, and speed responsive mechanism mounted on said carrier in the spaces between said planet gears and operatively connected to said clutch mechanism.

7. In a change speed transmission, the combination of a drive shaft, a driven shaft, change speed planetary gearing between said shafts including a planetary gear carrier, jaw clutch mechanism connecting said gearing to revolve as a unit with said shafts including a shiftable clutch element, one way automatic brake mechanism for holding said carrier against backward movement and mounted on said shiftable element and including a brake member, manually releasable means for holding said brake member against rotation, speed responsive mechanism controlling said clutch mechanism, and manually operable means for moving said shiftable clutch element.

8. In a change speed transmission, the combination of a drive shaft, a driven shaft, change speed planetary gearing between said shafts including a planetary gear carrier and spaced sets of planetary gears, a jaw clutch for connecting said gearing to revolve as a unit with said shafts including a shiftable clutch element, speed responsive means disposed in the spaces between said planet gears for actuating said element and including rods secured to said element, thimbles slidably mounted on said rods, weighted levers pivotally mounted on said carrier and operatively connected to said thimbles, springs providing yielding connections between said thimbles and said rods, and spring means mounted on said carrier and opposing the movement of said thimbles by said weights and having connection through said thimbles with said rods for urging said clutch element to a release position.

9. In a change speed transmission, the combination of a drive shaft, a driven shaft, change speed planetary gearing between said shafts for driving said driven shaft at a different gear ratio from that of said drive shaft, clutch mechanism for connecting said gearing to revolve as a unit with said shafts for direct drive, speed responsive means controlling said clutch mechanism, and an overrunning clutch connection between said shafts preventing free wheeling of said drive shaft.

10. In a change speed transmission, the combination of a drive shaft, a driven shaft, change speed planetary gearing between said shafts for driving said driven shaft at a different gear ratio from that of said drive shaft, including a planetary gear carrier, an automatic one way brake mechanism for holding said carrier against backward movement, clutch mechanism for connecting said gearing to revolve as a unit with said shafts for direct drive, speed responsive means controlling said clutch mechanism and operable on a temporary reduction in speed of the driver gear of said gearing relative to the driven gear, and an overrunning clutch connection between said shafts preventing free wheeling of said drive shaft.

11. In a change speed transmission, the combination of a drive shaft, a driven shaft, change speed gearing between said shafts, clutch mechanism for connecting said gearing to revolve as a unit with said shafts including a movable clutch element, speed responsive means for actuating said element including a weighted lever, a rod, a member slidably mounted on said rod, a spring connection between said rod and member, and spring means acting on said member and normally resisting the movement of said weighted lever.

12. In a change speed transmission, the combination of a drive shaft, a driven shaft, change speed planetary gearing between said shafts including a planetary gear carrier, clutch mechanism connecting said gearing to revolve as a unit with said shafts including a shiftable clutch element, one way automatic brake mechanism for holding said carrier against backward movement and mounted on said shiftable element and including a brake member, manually releasable means for holding said brake member against rotation, speed responsive mechanism controlling said clutch mechanism, and manually operable means for moving said shiftable clutch element.

13. In a change speed transmission, the combination of a drive shaft, a driven shaft, change speed planetary gearing between said shafts for driving said driven shaft at a different gear ratio from that of said drive shaft, jaw clutch mechanism for connecting said gearing to revolve as a unit with said shafts for direct drive including a shiftable clutch element, speed responsive means controlling said shiftable clutch element operable on a reduction in speed of said drive shaft relative to said driven shaft, and manually operable means for releasing said clutch element for immediately establishing the drive through said gearing.

OSCAR H. BANKER.